(12) United States Patent
Peden et al.

(10) Patent No.: US 10,716,021 B1
(45) Date of Patent: Jul. 14, 2020

(54) MINIMIZATION OF DRIVE TEST (MDT) DATA DONOR DEVICE SELECTION

(71) Applicant: Sprint Communications Company L.P., Overland Park, KS (US)

(72) Inventors: Mark D. Peden, Olathe, KS (US); Raymond E. Reeves, Oviedo, FL (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 111 days.

(21) Appl. No.: 16/040,462

(22) Filed: Jul. 19, 2018

(51) Int. Cl.
| | |
|---|---|
| G06F 15/173 | (2006.01) |
| H04W 24/08 | (2009.01) |
| H04L 9/06 | (2006.01) |
| H04W 64/00 | (2009.01) |
| H04W 4/38 | (2018.01) |
| H04W 24/10 | (2009.01) |
| G06F 16/27 | (2019.01) |

(52) U.S. Cl.
CPC ............ *H04W 24/08* (2013.01); *G06F 16/27* (2019.01); *H04L 9/0643* (2013.01); *H04W 4/38* (2018.02); *H04W 24/10* (2013.01); *H04W 64/00* (2013.01); *H04L 2209/38* (2013.01)

(58) Field of Classification Search
CPC ....... H04W 24/08; H04W 24/10; H04W 4/38; H04W 64/00; G06F 16/27; H04L 9/0643; H04L 2209/38
USPC .................................................. 709/223, 224
See application file for complete search history.

(56) References Cited

U.S. PATENT DOCUMENTS

| | | | |
|---|---|---|---|
| 6,490,519 B1 * | 12/2002 | Lapidot ................. | G01C 21/34 340/905 |
| 8,176,167 B2 * | 5/2012 | Fok ........................ | H04L 43/00 455/466 |
| 9,264,151 B1 * | 2/2016 | Emigh ............... | G06Q 30/0211 |
| 9,877,213 B1 | 1/2018 | Wang et al. | |
| 2003/0078777 A1 * | 4/2003 | Shiau ...................... | G10L 15/30 704/251 |
| 2006/0142913 A1 | 6/2006 | Coffee et al. | |
| 2008/0039121 A1 * | 2/2008 | Muller ................ | H04M 7/0036 455/456.3 |
| 2008/0052393 A1 * | 2/2008 | McNaughton ........ | H04L 41/147 709/224 |

(Continued)

OTHER PUBLICATIONS

Notice of Allowance dated Oct. 4, 2017, U.S. Appl. No. 15/351,423, filed Nov. 14, 2016.

*Primary Examiner* — Thu Ha T Nguyen

(57) ABSTRACT

A minimization drive test (MDT) selection server computer. The server comprises a processor, a non-transitory memory; and an MDT selection application stored in the non-transitory memory. When executed by the processor the MDT selection application receives a mobile communication device selection criteria, where the criteria identifies a device candidate profile, determines a degree of match of a plurality of MDT candidate mobile communication devices to the device candidate profile, selects a population of mobile communication devices to perform the MDT based at least in part on the degree of match of the mobile communication devices to the device candidate profile, and causes the selected population of mobile communication devices to perform the MDT.

20 Claims, 8 Drawing Sheets

(56) References Cited

U.S. PATENT DOCUMENTS

| | | | |
|---|---|---|---|
| 2008/0052394 A1* | 2/2008 | Bugenhagen | H04L 43/0894 709/224 |
| 2008/0098464 A1* | 4/2008 | Mizrah | G06F 21/36 726/5 |
| 2011/0093340 A1* | 4/2011 | Kramer | G06Q 30/02 705/14.58 |
| 2011/0319063 A1* | 12/2011 | Nanda | H04M 3/42008 455/416 |
| 2012/0100884 A1* | 4/2012 | Radulescu | H04W 36/0083 455/524 |
| 2012/0324100 A1* | 12/2012 | Tomici | H04L 45/123 709/224 |
| 2013/0024105 A1* | 1/2013 | Thomas | H04W 4/023 701/410 |
| 2013/0117128 A1* | 5/2013 | Coppinger | G06Q 30/0207 705/14.66 |
| 2013/0137464 A1* | 5/2013 | Kramer | G06Q 30/02 455/456.3 |
| 2013/0290525 A1* | 10/2013 | Fedor | H04L 41/147 709/224 |
| 2014/0297847 A1* | 10/2014 | Heinz | H04L 41/5025 709/224 |
| 2015/0127569 A1* | 5/2015 | Baldwin | H04W 4/029 705/321 |
| 2015/0215790 A1* | 7/2015 | Davari | H04W 16/18 455/446 |
| 2015/0257118 A1* | 9/2015 | Siomina | G01S 5/021 455/456.1 |
| 2015/0295808 A1* | 10/2015 | O'Malley | H04L 47/22 709/224 |
| 2016/0065419 A1* | 3/2016 | Szilagyi | H04L 41/5067 709/224 |
| 2016/0165642 A1* | 6/2016 | Lunden | H04W 72/04 455/450 |
| 2016/0366126 A1* | 12/2016 | Sharifi | H04L 63/083 |
| 2017/0280374 A1* | 9/2017 | Hayes | H04W 56/0015 |
| 2018/0035322 A1* | 2/2018 | Yamine | H04W 24/08 |
| 2018/0349849 A1* | 12/2018 | Jones | G06N 20/00 |
| 2019/0271553 A1* | 9/2019 | Simpson | G06Q 50/01 |
| 2019/0272589 A1* | 9/2019 | Simpson | G06Q 30/0609 |

\* cited by examiner

MINIMIZATION OF DRIVE TEST (MDT) DATA DONOR DEVICE SELECTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Minimization of drive test (MDT) is a mechanism for obtaining wireless communication network performance data without hiring dedicated resources to conduct the collection of performance data. Traditionally, driving testing involved an instrumented motor vehicle, such as a truck, to drive around collecting wireless communication network performance data, such as signal strength, coverage, dropped call rates, blocked call rates, and other wireless communication network performance data. Traditional drive testing is often expensive. Additionally, traditional drive testing may not provide timely response. For example, if a desire to conduct a drive test in a specific area with a specific performance data collection goal occurred ad hoc (e.g., a performance problem were discovered), it might be necessary to go to the back of the line and schedule the desired drive test a month later or six weeks later. MDT uses mobile communication devices of subscribers to wireless communication services as data gathering probes. Thus, the desired wireless communication network performance data is obtained by initiating test programs on the mobile communication devices of users and the test programs relaying the performance data back to the requesting system. MDT can provide high quality performance data at a relatively low cost and with minimal scheduling delay.

SUMMARY

In an embodiment, a method of performing a minimization drive test (MDT) using mobile communication devices is disclosed. The method comprises receiving a mobile communication device selection criteria by a MDT selection application executing on a computer system, where the criteria defines at least two of a mobile communication device location, a mobile communication device model, a mobile communication device software version, a mobile communication service subscriber profile, and a subscriber mobility pattern and selecting a first population of MDT candidate mobile communication devices by the MDT selection application based on the subscribers associated with the mobile communication device having consented to use of the mobile communication device in MDT. The method further comprises, for each mobile communication device in the first population of MDT candidate mobile communication devices, determining a degree of match of the MDT candidate mobile communication device to the mobile communication device selection criteria by the MDT selection application, selecting a second population of MDT candidate mobile communication devices from the first population of MDT candidate mobile communication devices by the MDT selection application based at least in part on the degree of match of first population of MDT candidate mobile communication devices to the mobile communication device selection criteria, and causing at least some of the mobile communication devices in the second population of MDT candidate mobile communication devices to perform a MDT.

In another embodiment, a minimization drive test (MDT) selection server computer is disclosed. The MDT server computer comprises a processor, a non-transitory memory, and an MDT selection application stored in the non-transitory memory. When executed by the processor, the MDT selection application receives a mobile communication device selection criteria, where the criteria identifies a device candidate profile, identifies a matching threshold, and identifies a number of mobile communication devices that are to perform a MDT and determines a degree of match of a plurality of MDT candidate mobile communication devices to the device candidate profile. The MDT selection application further identifies a first population of MDT candidate mobile communication devices that achieve a degree of match to the device candidate profile above the matching threshold of the criteria and analyzes a MDT participation history of each of the first population of MDT candidate mobile communication devices. The MDT application further identifies a second population of MDT candidate mobile communication devices among the first population of MDT candidate mobile communication devices based on the analysis of the MDT participation histories of the devices in the first population of MDT candidate mobile communication devices, where the number of devices in the second population of MDT candidate mobile communication devices is at least as large as the number of mobile communication devices identified in the mobile communication device selection criteria and causes the mobile communication devices in the second population of MDT candidate mobile communication devices to perform a MDT.

In yet another embodiment, a method of performing a minimization drive test (MDT) using mobile communication devices is disclosed. The method comprises receiving a mobile communication device selection criteria by a MDT selection application executing on a computer system and selecting a plurality of MDT candidate mobile communication devices by the MDT selection application based on the selection criteria. The method further comprises causing the MDT candidate mobile communication devices to perform a MDT and collecting MDT data from the MDT candidate mobile communication devices. The method further comprises generating a block of a MDT block chain where the block comprises a nonce value, comprises a data content portion that comprises the MDT data collected from the MDT candidate mobile communication devices, and comprises a hash value that is calculated based on a hash value of a preceding block of the MDT block chain, based on the data content portion, and based on the nonce value and sending the block to a MDT block chain management server for adding to the MDT block chain, whereby MDT data generated by multiple different wireless communication service providers is shared in a transparent and secure manner.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
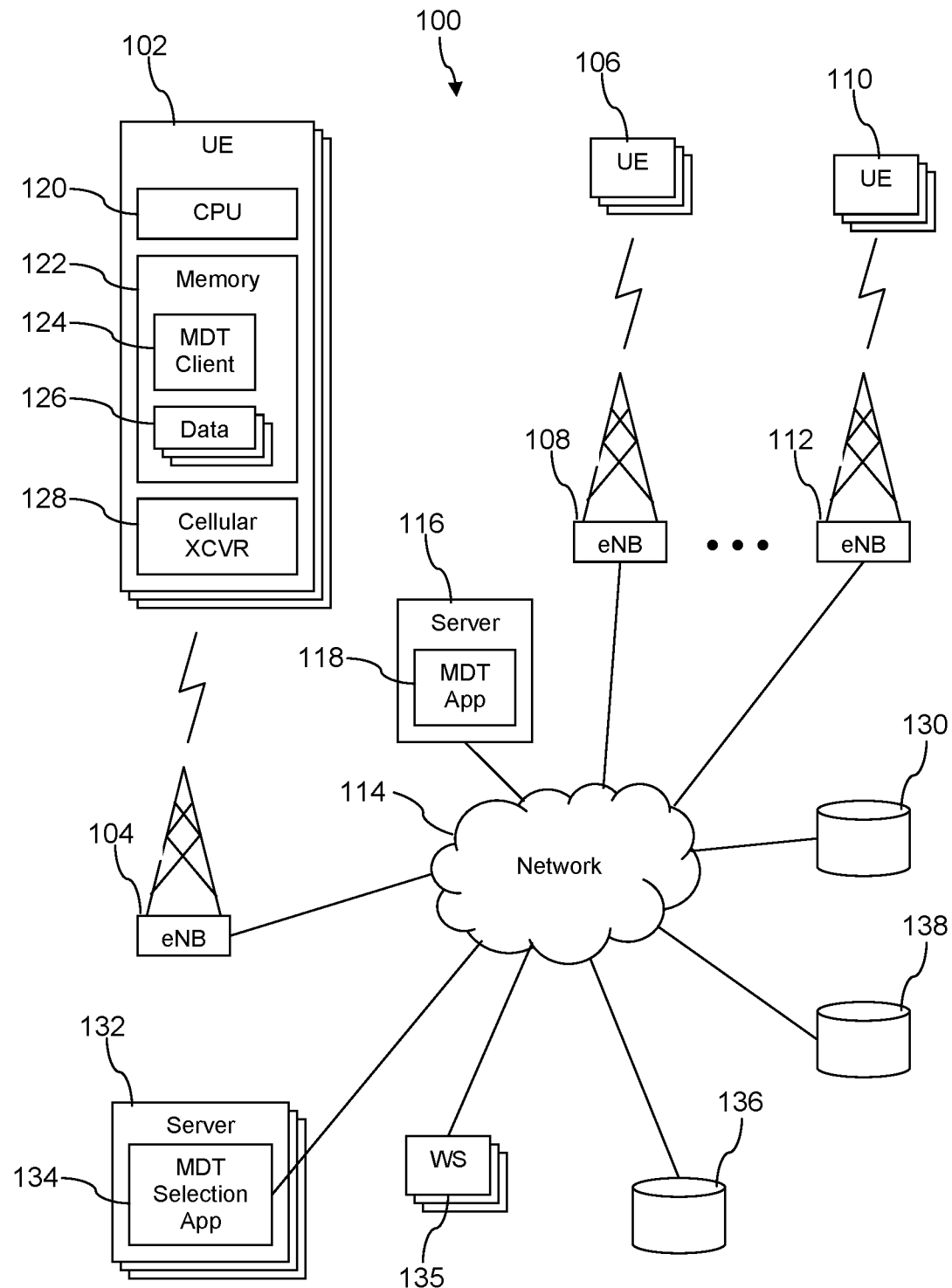
- FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and methods for conducting minimization drive test (MDT). When it is desired to conduct an MDT, a question arises as to what mobile communication devices should be recruited to perform the MDT. In some contexts, the mobile communication devices that are recruited and perform the MDT may be referred to as data donor devices. In an embodiment, a criteria is provided that identifies a number of mobile communication devices that are desired to perform the MDT as well as contextual or profile information (e.g., a device candidate profile) of the preferred mobile communication device to be recruited. The criteria can also identify a matching threshold or correlation threshold that quantifies how closely a candidate device should match the contextual or profile information to be included in the MDT. The criteria may be provided by a customer care agent, a network engineer, an information technology worker, a system administrator, or another via a workstation user interface to a MDT selection application executing on a computer system.

The selection application executing on a computer system accesses a data store of device profiles associated with mobile communication devices that are available for performing MDT (e.g., devices that have not opted out of the MDT system). The mobile communication devices that are available for performing MDT may be considered to be a first population of devices or a first list of devices. The selection application obtains contextual information about the devices. For example, for each mobile communication device, the selection application may look up or access a model identity of the device, a software version of the device, a subscriber profile associated with the device, and a mobility pattern of the device. The selection application may determine a degree of match or a correlation of the contextual information associated with each mobile communication device to the preferred device candidate profile defined in the criteria for the MDT. The selection application produces a second list or second population of mobile communication devices whose match to the preferred device candidate profile meets or exceeds the matching threshold defined in the criteria.

When the number of devices in the second population or on the second list exceeds the number of devices desired to execute the MDT identified in the criteria, the selection application will then select a sub-set of devices from the second population or second list for use in performing the MDT to define a third population or list of devices that will actually perform the MDT. A variety of approaches may be used to select the members of the third population from among the devices in the second population of devices. In an embodiment, the members of the third population may be selected based on maximizing the total of the correlations or matching scores. In an embodiment, the selection application consults a MDT history of each mobile communication device in the second population to identify those devices that have performed MDT least frequently, selecting these devices for the third population of devices that will actually conduct the MDT, thereby distributing the duties of MDT more evenly. The MDT history may be referred to as a MDT participation history of the UEs.

In an embodiment, the MDT data that is collected from the mobile communication devices is made available to a plurality of different parties, for example a plurality of different mobile communication service providers or other organizations involved with mobile communications. For example, the MDT data collected from mobile communication devices subscribed to a first wireless communication service provider may be made available for use by a second wireless communication service provider; and MDT data collected from mobile communication devices subscribed to the second wireless communication service provider may be made available for use by the first wireless communication service provider. Sharing MDT data in this way may reduce the burden on mobile communication devices to participate in MDT activities. To promote sharing this information securely, in an embodiment, data collected during an MDT may be stored on a MDT block chain that is maintained by a third party or by a collaborating group of wireless communication service providers.

Each block on the MDT block chain may correspond to a single MDT execution. The data of the block may comprise the MDT data collected from a plurality of mobile communication devices as well as the criteria defined for the MDT itself. Alternatively, the MDT data collected from each mobile communication device participating in an MDT may be stored in a separate block and built into a MDT block chain dedicated to that MDT. Data collected pursuant to a different MDT would be stored in a separate, different MDT block chain.

Turning now to FIG. 1, a communication system 100 is described. In an embodiment, the system 100 comprises a first plurality of mobile communication devices (user equipments (UEs)) 102 receiving wireless communication service coverage from a first cell site 104, a second plurality of UEs 106 receiving coverage from a second cell site 108, and a third plurality of UEs 110 receiving coverage from a third cell site 112. The cell sites 104, 108, 112 communicatively couple the UEs 102, 106, 110 to a network 114. The system 100 may comprise any number of UEs and any number of cell sites. In an embodiment, the system 100 may comprise hundreds of millions of UEs and hundreds of thousands of cell sites. The cell sites 104, 108, 112 may provide wireless communication links to the UEs 102, 106, 110 according to a code division multiple access (CDMA) wireless communication protocol, a global system for mobile communication (GSM) wireless communication protocol, a long-term evolution protocol (LTE) wireless communication protocol, a world-wide interoperability for microwave access (WiMAX) wireless communication protocol, or any other wireless communication protocol. The UEs 102, 106, 110 may be a mobile phone, a smart phone, a personal digital assistant (PDA), a media player, a wearable computer, a headset computer, a laptop computer, a notebook computer, a tablet computer, or another wireless communication device. The network 114 comprises one or more public networks, one or more private networks, or a combination thereof.

A first server computer 116 executes a minimization drive test (MDT) server application 118 to manage and control MDT activities performed by the UEs 102, 106, 110. The UE 102 comprises a processor 120, a memory 122, and a cellular radio transceiver 128. The memory 122 comprises a non-transitory portion that stores a minimization drive test (MDT) client application 124. In an embodiment, the memory 122 may further comprise a transitory portion. After the UE 102 and the MDT client 124 have performed MDT activities, for example under the management of the MDT server application 118, the memory 122 may store MDT data 126, either in the non-transitory portion of the memory 122 or in a transitory portion of the memory 122. The components of the UEs 106, 110 are substantially similar to the components of the UE 102.

The MDT server application 118 receives an MDT manifest from a second server computer 132 executing a minimization drive test (MDT) device selection application 134. The MDT manifest identifies UEs 102, 106, 110 that are to be recruited to perform the MDT (e.g., devices in the third population of devices referred to above) and further defines relevant test constraints, for example times of day when the MDT is to be conducted, how long each UE 102, 106, 110 is to conduct the MDT. The MDT manifest may comprise a list of MDT processes or test actions to perform. Said in other words, the MDT manifest may define a suite of tests to be performed by the MDT client applications 124 executing on the UEs 102, 106, 110. The MDT server application 118 manages the UEs 102, 106, 110 in conducting the MDT according to the MDT manifest.

In an embodiment, the MDT client application 124 may be configured to execute different test code, test processes, or test actions to obtain MDT data or network performance data associated with different performance parameters. The MDT manifest may identify MDT data or network performance data to be collected during the MDT associated with the MDT manifest. The MDT server application 118 instructs the MDT client applications 124 of the selected UEs 102, 106, 110 (e.g., the UEs identified in the MDT manifest) to collect MDT data 126 on one or more different performance parameters identified in the MDT manifest, and the MDT client applications 124 autonomously identify and execute the appropriate test codes, test processes, or test actions to collect the identified performance parameter MDT data. The MDT client application 124 may report the MDT data 126 upon completion of MDT operations. Alternatively, the MDT client application 124 may wait for the MDT server application 118 to request the MDT data 126 and send it on that event. In an embodiment, the MDT client application 124 may transmit the MDT data 126 directly to a MDT results data store 130 or may transmit the MDT data 126 to the MDT server application 118, and the MDT server application 118 may transmit the MDT data 126 to the MDT results data store 130. Alternatively, the MDT client 124 may transmit the MDT data 126 to a MDT data block chain manager computer system (not shown) which creates one or more MDT blocks that comprise the MDT data 126 and adds the MDT block into a MDT data block chain stored on the MDT results data store 130.

The MDT data 126 may comprise information about a wide variety of wireless communication network performance such as dropped call rates, blocked call rates, signal strength, signal to noise ratios (SNRs), and other performance parameters. The MDT data 126 may associate the MDT data with identities and/or model identities of the UEs 102, 106, 110 that provided the data. The MDT data 126 may link MDT data with locations and/or times. The MDT data 126 associated with a single MDT manifest may be segregated from other MDT data stored in the MDT results data store 130. The data in the MDT results data store 130 associated with a single MDT manifest may comprise the manifest itself (e.g., may comprise data or metadata in addition to MDT data 126 provided by UEs 102, 106, 110). In an embodiment, the MDT server application 118 stores the MDT results associated with a single MDT manifest in a block of a MDT data block chain in the MDT results data store 130. The use of block chain to store MDT data is discussed further hereinafter with reference to FIG. 2.

In an embodiment, the MDT client application 124 may transmit the MDT data 126 to an MDT data block chain management server (not shown) that receives the MDT data 126 from different UEs 102, 106, 110 and stores the MDT data 126 in the MDT results data store 130. In an embodiment, the MDT data block chain management server may store the MDT data 126 in an MDT block chain or in a plurality of MDT block chains. The MDT data block chain management server may receive MDT data 126 associated with different MDTs and/or different MDT manifests and manage storage and segregation of MDT data 126 associated with different MDTs in the MDT results data store 130. Storing of MDT data 126 in a block chain or a plurality of block chains is described further hereinafter with reference to FIG. 2.

A plurality of second server computers 132 may each execute the MDT device selection application 134 and generate MDT manifests to be sent to and executed by the MDT server application 118. For example, each of a plurality of different wireless communication service providers may operate its own second server 132 executing the MDT device selection application 134. In an embodiment, the first server 116 executing the MDT server application 118 may be operated by a third party independent of the parties (e.g., wireless communication service providers) who operate the second servers 132 that execute the MDT device selection application 134. The server computers 116, 132 may be implemented as computer systems. Computer systems are described further hereinafter.

The MDT selection application 134 may receive a set of criteria for an MDT to initiate an MDT, for example from a workstation 135. The workstation 135 may initiate an MDT for a variety reasons. A customer care employee may initiate an MDT when more than a threshold number of customer care calls have described a similar problem experienced with a UE 102, 106, 110. The MDT results 126 collected from the UEs 102, 106, 110 and stored in the MDT results data store 130 can be analyzed to troubleshoot and address the root cause of the problems reported to customer care. A traffic engineer may initiate an MDT to obtain a network performance survey in a newly built out area of a radio access network, for example a location where several new cell sites have been commissioned. The MDT results 126 collected can be analyzed by the traffic engineer to evaluate the newly built out area and potentially adapt operation parameters of the new cell sites, such as antenna tilts, beam forming coefficients, and other operation parameters. The traffic engineer may complete a series of MDT cycles and cell site parameter adaptations to optimize performance in the newly built out area. An engineer or other may initiate an MDT to collect early performance data associated with a recently deployed model of UE. The engineer may use the MDT data 126 to evaluate and possibly adapt firmware configurations of the recently deployed model of UE, for example adapting network radio parameters configured into the newly deployed model of UE.

The criteria provided by the workstation 135 may comprise one or more rules for selecting UEs for conducting the MDT. It is a teaching of the present disclosure that UEs are desirably selected to match a particular wireless communication network performance context. For example, an MDT may be initiated to help troubleshoot a specific wireless communication problem that has recurred or been reported to a customer care center more than a threshold number of times. Analysis of the communication problem may localize the problem to a specific device model, a specific software version, a specific subscriber profile, or a specific mobility pattern. It is understood that this localization need not constitute 100% correlation of a context with the given problem. Localization of context can be useful if the correlation of the context with the given problem is elevated. The MDT may then be targeted for execution by UEs 102, 106, 110 that are deemed to be "like" the localized context determined in the analysis of the communication problem reports. A UE being "like" the localized context may be determined based on a numerical correlation or degree of match of the context of the UE (e.g., device model, device software version, profile of a subscriber associated with the device, mobility pattern of the device, or other contextual or environmental factors) to the device candidate profile defined by the criteria. In some cases, the criteria may identify a location constraint. Said in other words, the criteria may in effect specify that an MDT take place on UEs 102, 106, 110 located within a defined geographical boundary or region.

The workstation 135 can define rules describing contextual elements and identifying correlation thresholds to be applied. The workstation 135 can identify a number of UEs 102, 106, 110 that desirably are to be recruited to perform the MDT. The workstation 135 can identify what network performance parameters the MDT client applications 124 of the recruited UEs 102, 106, 110 are to collect. The workstation 135 may identify a number of samples of each parameter each MDT client application 124 of recruited UEs 102, 106, 110 are to collect. Alternatively, the workstation 135 may identify a time duration that each MDT client application 124 of recruited UEs 102, 106, 110 are to conduct the MDT and optionally a duty cycle for executing the MDT. For example, the workstation 135 may identify that each MDT client application 124 is to execute the MDT for 4 hours, 12 hours, 24 hours, three days, or some other duration of time. Further, optionally the workstation 135 may identify a duty cycle for executing the MDT. For example, the workstation 135 may identify that each MDT client application 124 is to execute the MDT for 10% of the time; 5% of the time; 1% of the time; 0.5% of the time, or some other duty cycle. In an embodiment, the MDT selection application 134 provides access to a user interface, for example a web application interface, to the workstation 135 that promotes ease of defining rules and criteria for MDTs for users of the workstations 135.

The MDT selection application 134 identifies a set of UEs 102, 106, 110 to be recruited to perform the MDT defined by the criteria input by the workstation 135. In an embodiment, the UEs 102, 106, 110 to be recruited to perform the MDT may be recruited form mobile communication devices that are associated with two or more different wireless communication service providers (e.g., some of the UEs 102, 106, 110 receive their primary service from a first wireless service provider and others of the UEs 102, 106, 110 receive their primary service from a second wireless service provider what is different from the first wireless communication service provider). The MDT selection application 134 accesses a UE device profile data store 136 and a minimization drive test (MDT) history data store 138 to determine UEs 102, 106, 110 that match sufficiently well with the context criteria identified by the workstation 135 and to select which of those matching UEs are to be recruited based on a history of device recruitment in previous MDTs. The MDT history data store 138 may store MDT participation histories of each of the UEs 102, 106, 110. The UE device profile data store 136 may comprise information for each UE 102, 106, 110 as well as information about a subscriber associated with the UE 102, 106, 110. An entry keyed to a UE 102, 106, 110 (e.g., a key comprising a mobile directory number (MDN), a mobile equipment identity (MEID), or other identifier) may comprise two or more of an identity of the device model of the UE, an identity of a software version of the UE, a catalog of user applications installed on the UE, a identity of an antenna type of the UE, a definition of a mobility pattern of the UE, a definition of a usage pattern of the UE, demographic information about the subscriber associated with the UE, and other information.

The MDT selection application 134 may desirably select UEs 102, 106, 110 for recruitment so as to spread the burden of participating in MDT operations relatively evenly across all UEs. For example, if 10,000 UEs sufficiently match a device candidate profile criteria or a device context criteria and only 2,000 UEs are desired to perform the MDT, the MDT selection application 134 may select 2,000 UEs from the 10,000 suitable UEs so as to balance the number of times the 10,000 suitable UEs have performed MDT operations.

The MDT selection application 134 provides an identifier of each of the recruited UEs 102, 106, 110 and includes these identifiers in the MDT manifest. These identifiers may be a mobile directory number (MDN) and/or an Internet Protocol address associated with the recruited UEs 102, 106, 110. In an example, the identifiers of the recruited UEs 102, 106, 110 provided in the MDT manifest are suitable for use by the MDT server application 118 to contact the MDT client applications 124 of the recruited UEs 102, 106, 110 and cause them to conduct the MDT operations identified in the MDT manifest. The MDT selection application 134 further determines and builds into the MDT manifest what network performance data is to be collected in the MDT and/or what specific MDT tests or processes are to be executed by the MDT client applications 124 on the recruited UEs 102, 106, 110. After the MDT client application 124 provides the MDT data 126, the MDT history data store 138 may be updated to reflect the participation of the UE on which the MDT client application 124 executes in this MDT.

Figure 2:
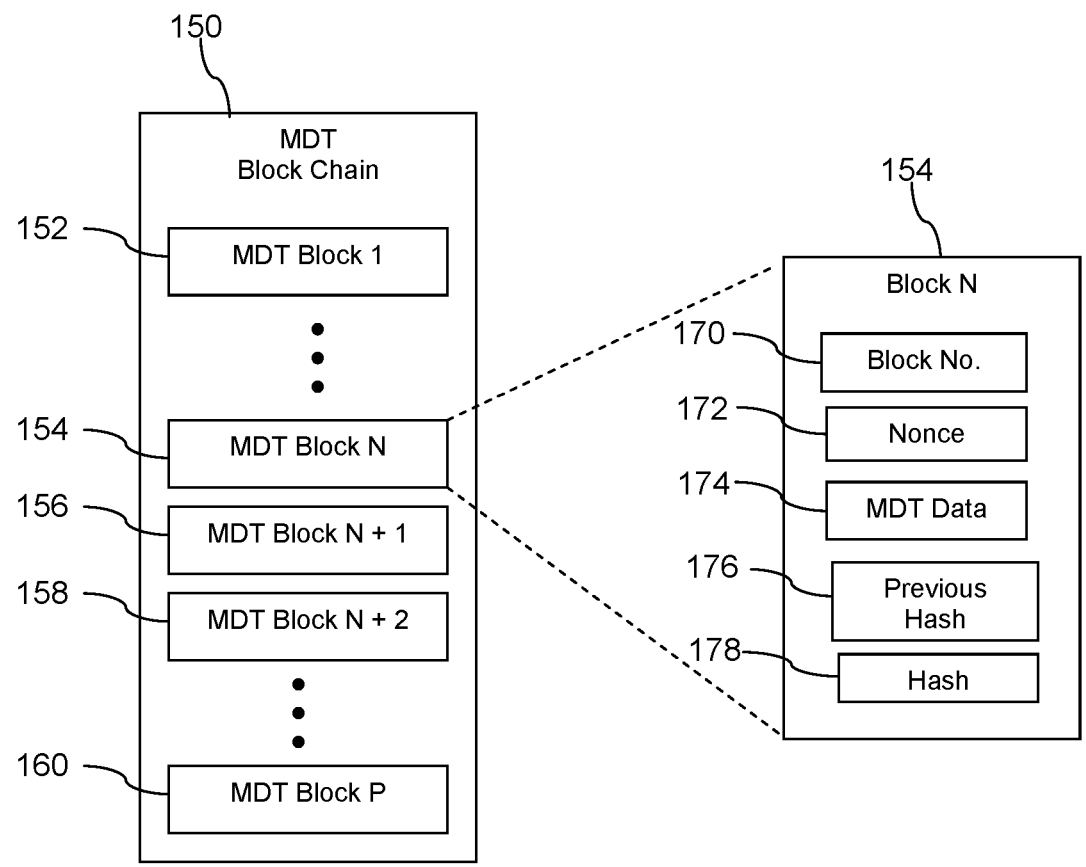
FIG. 2 is an illustration of a minimization of drive test (MDT) block chain according to an embodiment of the disclosure.

Turning now to FIG. 2, an MDT block chain 150 is described. In an embodiment, the MDT block chain 150 comprises a plurality of MDT blocks, a first MDT block 152, a second MDT block 154, a third MDT block 156, a fourth MDT block 158, and a fifth MDT block 160. It is understood that the MDT block chain 150 may comprise any number of MDT blocks. Each of the second MDT block 154, the third MDT block 156, and the fourth MDT block 158 have a structure as illustrated in the right side of FIG. 2 with reference to the second MDT block 154. The second MDT block 154 comprises a block number 170, a nonce value 172, MDT data 174, a previous hash value 176, and a hash value 178. In an embodiment, the MDT data 174 comprises all the MDT data 126 collected by a plurality of UEs 102, 106, 110 during a single MDT operation, and the MDT block chain 150 stores the MDT data 126 collected during a plurality of independent MDT operations. Alternatively, in an embodiment, the MDT data 174 comprises MDT data 126 collected from a single UE 102, 106, 110 and the MDT block chain 150 stores the MDT data 126 collected from a plurality of UEs 102, 106, 110 during the same MDT. In this alternative embodiment, each different MDT would be associated with a separate and independent MDT block chain 150.

The block number 170 may be a sequence number identifying a position of the MDT block 154 in the chain of blocks and may be an integer value. The nonce value 172 is a number that is selected such that the hash value 178 takes on a value having a particular property, such that the four most significant digits of the hash value 178 are all zeros. The previous hash value 176 is the hash value 178 of the preceding MDT block in the MDT block chain 150 (e.g., the MDT block having a block number 170 one less than the block number 170 of the subject MDT block 154). The hash value 178 is a number having a predefined number of digits that is calculated by applying a secure one-way hashing function to the block number 170, the nonce value 172, the MDT data 174, and the previous hash 176. It is generally considered that a block chain can be built such that falsifying the block chain in some way (e.g., altering the MDT data 174) in MDT blocks 154 is prohibitively expensive in terms of calculation and/or computer processing resources. Part of the inherent security of block chains and the difficulty of falsifying the block chain may be linked to maintaining a plurality of independently managed copies of the MDT block chain 150.

Figure 3:
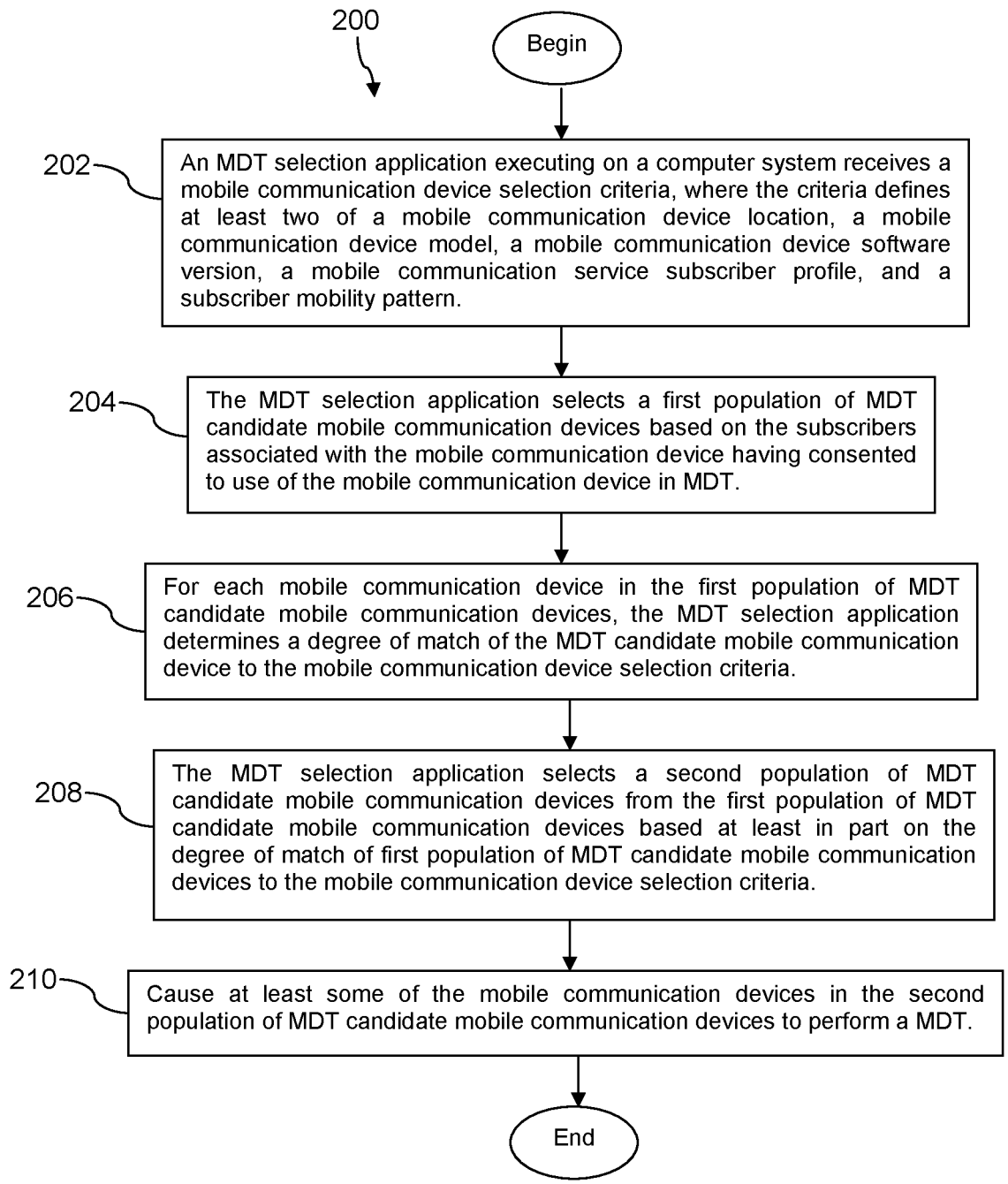
FIG. 3 is a flow chart of a method according to an embodiment of the disclosure.

Turning now to FIG. 3, a method 200 is described. At block 202, an MDT selection application executing on a computer system receives a mobile communication device selection criteria, where the criteria defines at least two of a mobile communication device location, a mobile communication device model, a mobile communication device software version, a mobile communication service subscriber profile, and a subscriber mobility pattern. For example, the MDT selection application 134 recruiting on the second server computer 132 receives a mobile communication device selection criteria for selecting among UEs 102, 106, 110 for conducting an MDT. At block 204, the MDT selection application selects a first population of MDT candidate mobile communication devices based on the subscribers associated with the mobile communication device having consented to use of the mobile communication device in MDT. For example, the MDT selection application 134 identifies which of the UEs 102, 106, 110 have previously opted in for participation in MDT activities. Alternatively, the MDT selection application 134 identifies which of the UEs 102, 106, 110 have previously opted out of participation in MDT activities and excludes them from further consideration for recruiting to perform MDT activities. Records of opt in or opt out decisions may be stored in the device profiles data store 136 associated to the UEs 102, 106, 110. Opt in may be referred to as consent; opt out may be referred to as non-consent. Records of consent and/or non-consent associated with the UEs 102, 106, 110 may be stored in the device profiles data store 136.

At block 206, for each mobile communication device in the first population of MDT candidate mobile communication devices, the MDT selection application determines a degree of match of the MDT candidate mobile communication device to the mobile communication device selection criteria (e.g., device candidate profile). In some cases the selection criteria defined by the workstation 135 may provide a definition of a method of scoring matches or correlations. For example, in one case an exact match on model identity may be more important than a match to a location criteria or more important than a match to a subscriber profile. In another case, however, an exact match on location criteria may be more important than a match on model identity or a match to subscriber profile. By defining a correlation or match calculation method, the criteria can support selection of devices for MDT in conformity with the intentions of an MDT requestor. At block 208, the MDT selection application selects a second population of MDT candidate mobile communication devices from the first population of MDT candidate mobile communication devices based at least in part on the degree of match of first population of MDT candidate mobile communication devices to the mobile communication device selection criteria. The MDT selection application 134 may build the list of the second population of MDT candidate mobile communication devices into a MDT manifest. The MDT selection application 134 may further provide other information in the MDT manifest such as described above.

At block 210, cause at least some of the mobile communication devices in the second population of MDT candidate mobile communication devices to perform a MDT. The processing of block 210 may involve the MDT server application 118, prompted by receiving the MDT manifest from the MDT selection application 134, to command selected ones of the UEs 102, 106, 110 to execute their MDT client applications 124 and perform tests in accordance with the MDT manifest. As a result of causing the mobile communication devices to perform the MDT, MDT result data 126 is generated by the MDT client applications 124 executing on the recruited UEs 102, 106, 110 (e.g., the UEs identified among the second population of MDT candidate mobile communication devices), and the MDT result data 126 is stored in the MDT results data store 130.

The MDT results stored in the MDT results data store 130 may be accessed, retrieved, and analyzed by a wireless communication service provider and the analysis used to improve their delivery of wireless communication services. For example, errors in installed firmware versions in mobile communication devices may be corrected and new firmware loaded into UEs 102, 106, 110. For example, new cell sites may be constructed and coverage expanded. For example, operational parameters of cell sites and/or of UEs 102, 106, 110 may be adapted or optimized. For example, subscribers may be discouraged from installing certain mobile applications on their devices known to excessively consume battery power reserves. In an embodiment, the MDT data produced by MDT candidate mobile communication devices performing MDT in block 210 may be produced by mobile communication devices that are provisioned to receive wireless communication service primarily from a first wireless communication service provider and the MDT results or MDT data are accessed, retrieved, and analyzed by a second wireless communication service provider different from the first wireless communication service provider and the retrieved MDT results used to adapt or optimize cell sites and/or UEs associated with the second wireless communication service provider.

Figure 4:
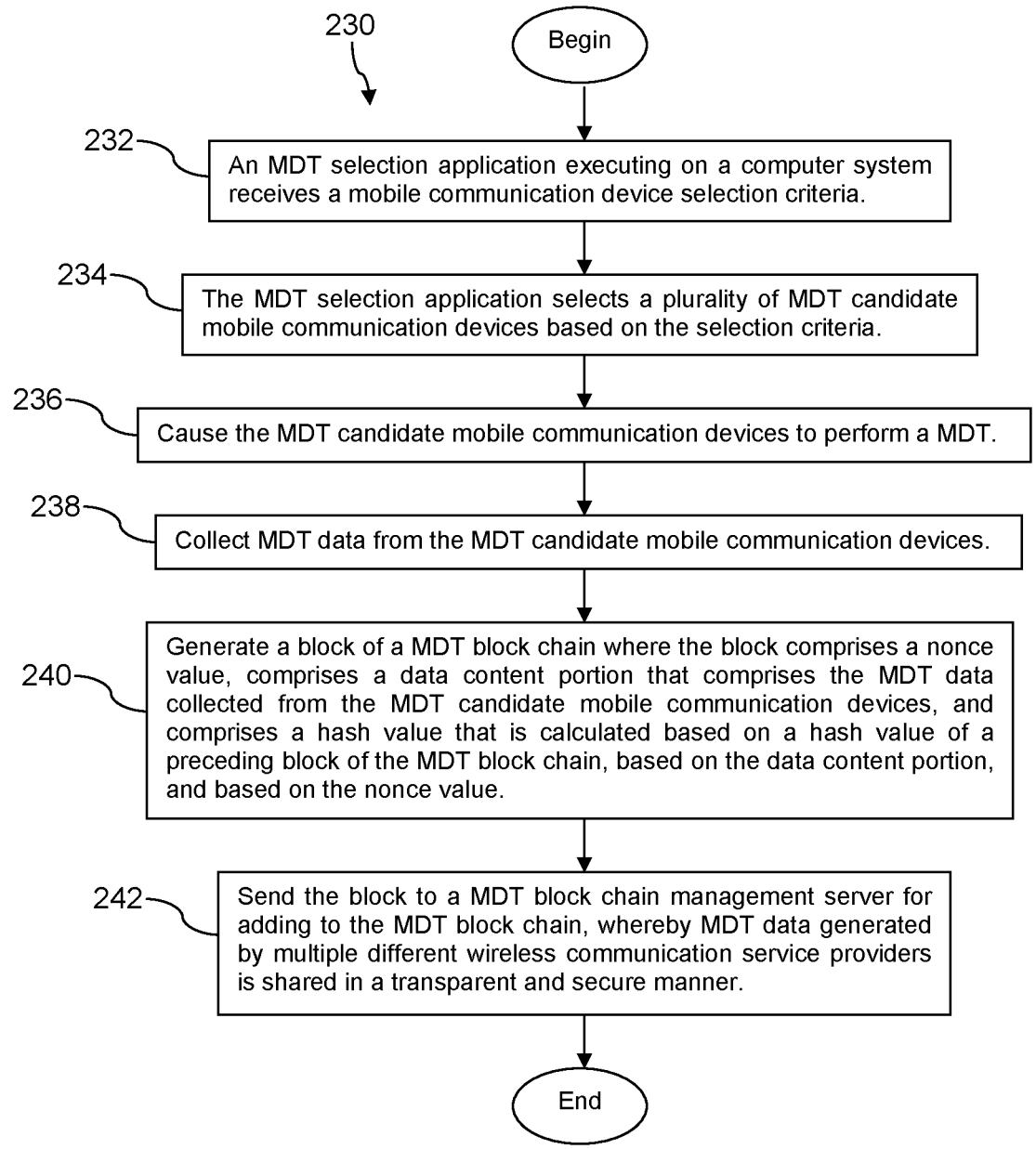
FIG. 4 is a flow chart of another method according to an embodiment of the disclosure.

Turning now to FIG. 4, a method 230 is described. At block 232, an MDT selection application executing on a computer system receives a mobile communication device selection criteria. At block 234, the MDT selection application selects a plurality of MDT candidate mobile communication devices based on the selection criteria. At block 236, cause the MDT candidate mobile communication devices to perform a MDT.

At block 238, collect MDT data from the MDT candidate mobile communication devices. At block 240, generate a block of a MDT block chain where the block comprises a nonce value, comprises a data content portion that comprises the MDT data collected from the MDT candidate mobile communication devices, and comprises a hash value that is calculated based on a hash value of a preceding block of the MDT block chain, based on the data content portion, and based on the nonce value. At block 242, send the block to a MDT block chain management server for adding to the MDT block chain, whereby MDT data generated by multiple different wireless communication service providers is shared in a transparent and secure manner. The method 230 may further comprise retrieving MDT data from the MDT block chain, analyzing the MDT data retrieved from the MDT chain, and adapting operation parameters of a cell site based on analyzing the MDT data. In an embodiment, the MDT mobile communication devices from which MDT data is collected in method 230 are configured to receive wireless communication service primarily with a first wireless communication service provider and the MDT data is retrieved by and analyzed by a second wireless communication service provider to adapt operation parameters of a cell site of the second wireless communication service provider.

Figure 5:
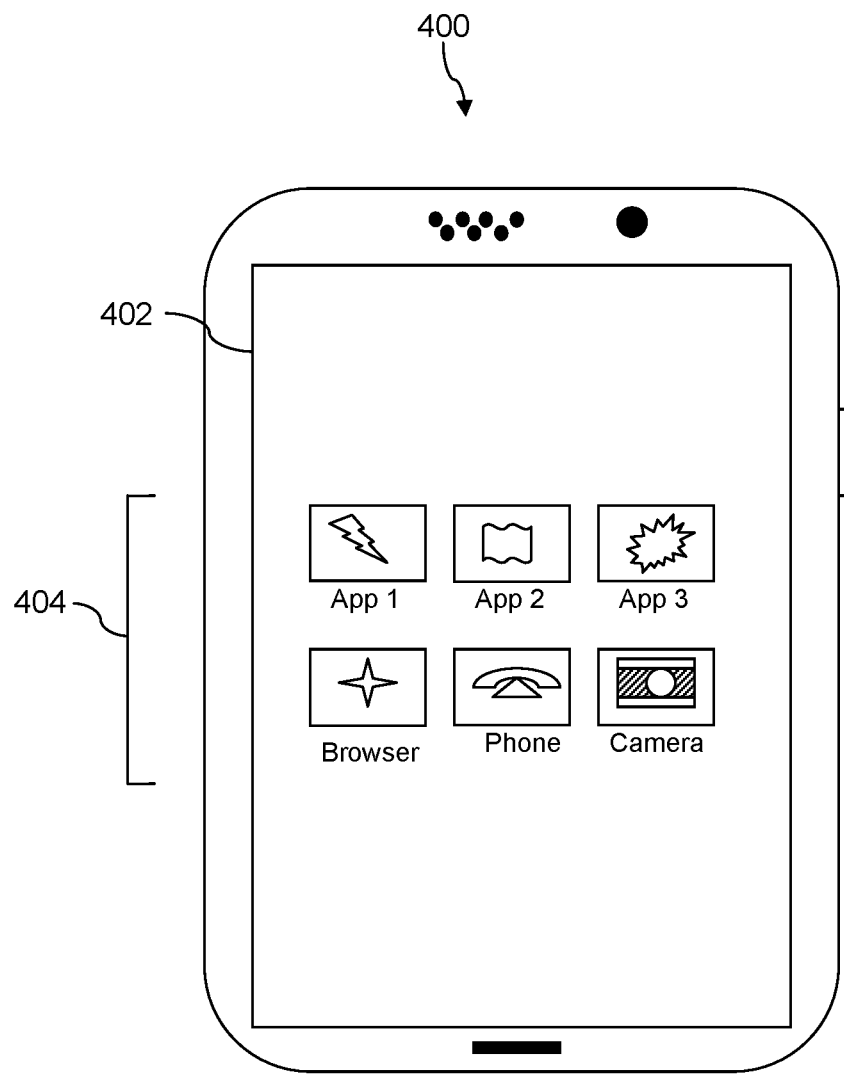
FIG. 5 is an illustration of a mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
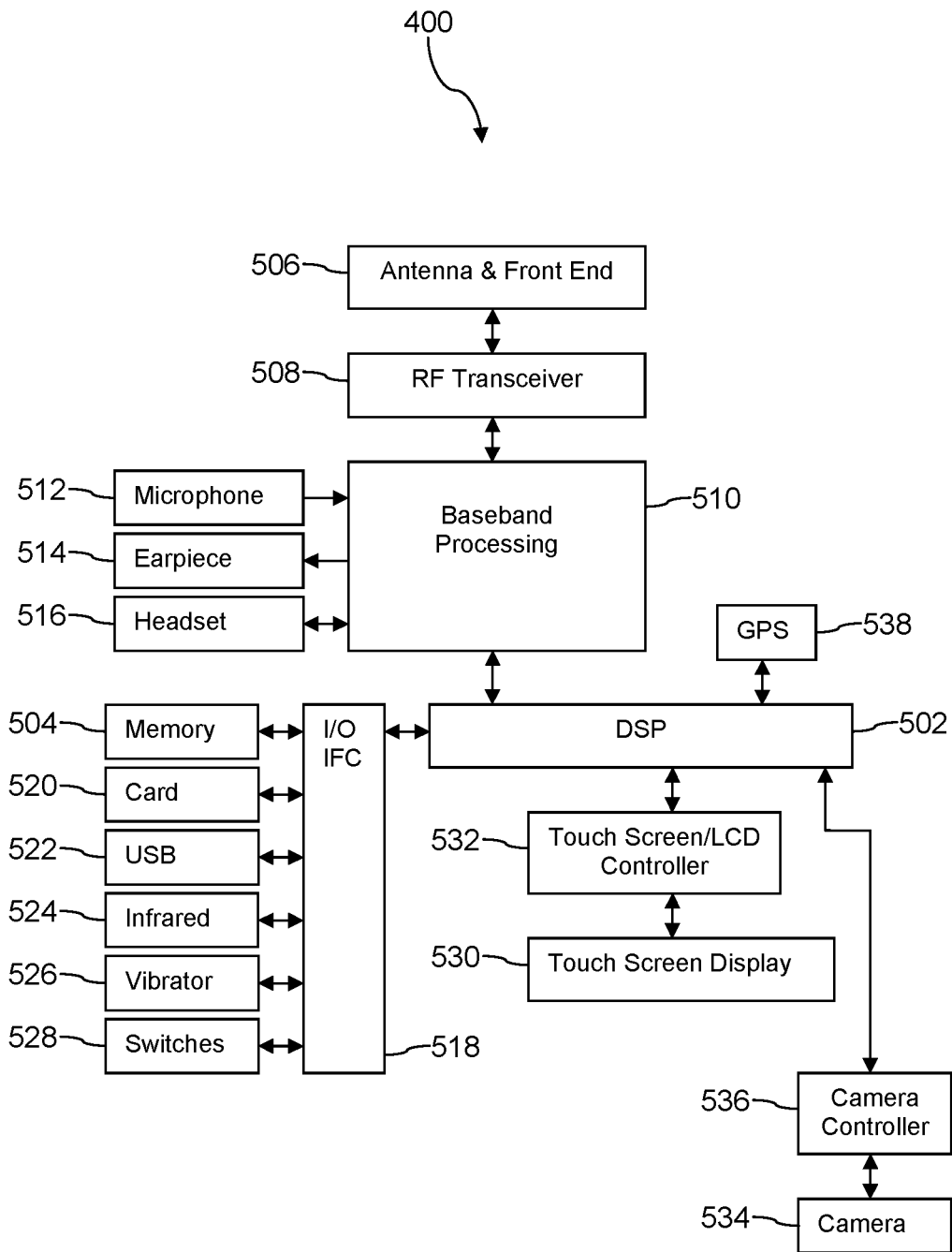
FIG. 6 is a block diagram of a hardware architecture of a mobile communication device according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
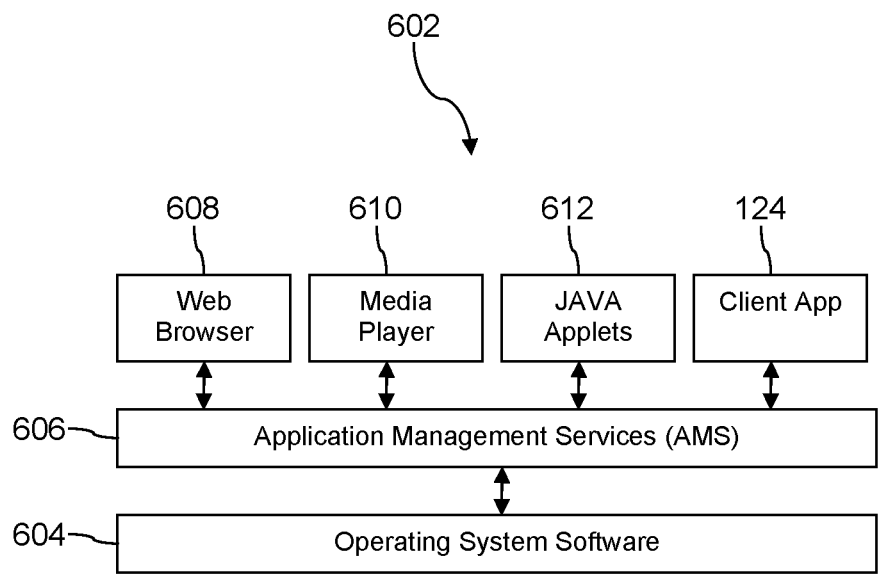
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, JAVA applets 612, and the MDT client application 124. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality. The MDT client application 124 may execute using services provided by AMS 606.

Figure 7B:
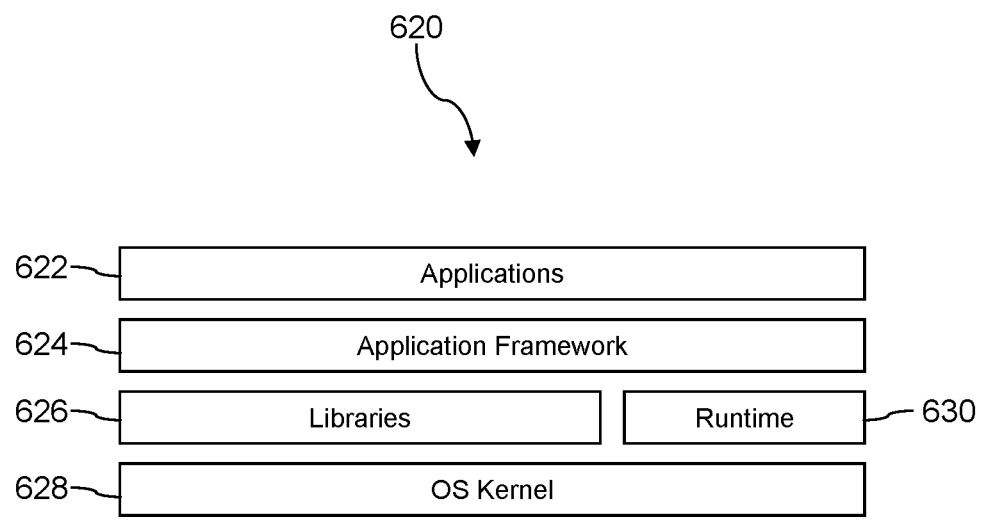
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
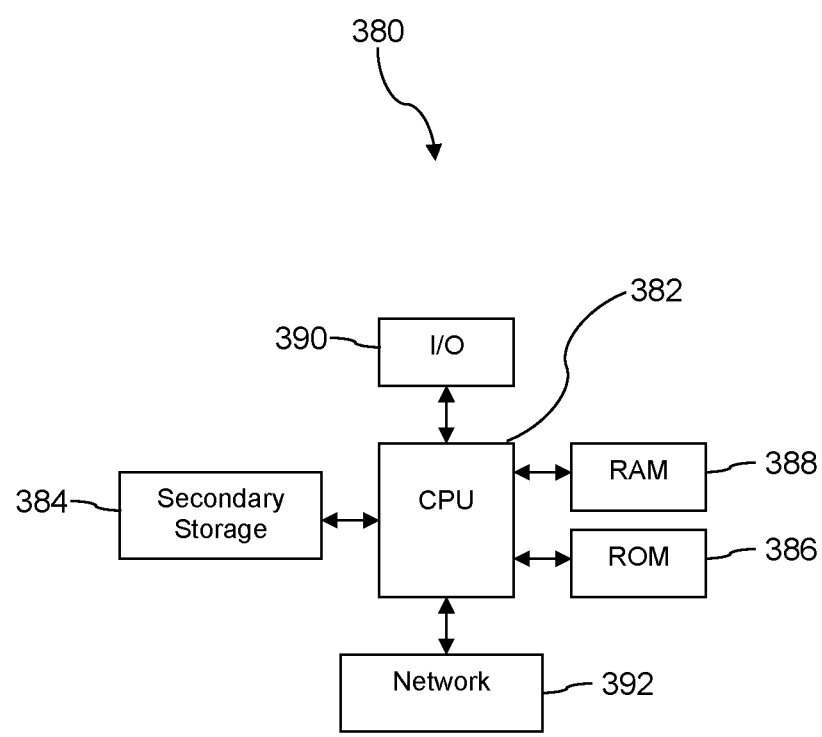
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of performing a minimization drive test (MDT) using mobile communication devices, comprising:
receiving a mobile communication device selection criteria by a MDT selection application executing on a computer system, where the criteria defines at least two of a mobile communication device location, a mobile communication device model, a mobile communication device software version, a mobile communication service subscriber profile, and a subscriber mobility pattern;
selecting a first population of MDT candidate mobile communication devices by the MDT selection application based on the subscribers associated with the mobile communication device having consented to use of the mobile communication device in MDT;
for each mobile communication device in the first population of MDT candidate mobile communication devices, determining a degree of match of the MDT candidate mobile communication device to the mobile communication device selection criteria by the MDT selection application;
selecting a second population of MDT candidate mobile communication devices from the first population of MDT candidate mobile communication devices by the MDT selection application based at least in part on the degree of match of first population of MDT candidate mobile communication devices to the mobile communication device selection criteria;
causing at least some of the mobile communication devices in the second population of MDT candidate mobile communication devices to perform a MDT;
collecting MDT data from the at least some of the MDT candidate mobile communication devices in the second population of MDT candidate mobile communication devices;
generating a block of a MDT block chain where the block comprises a nonce value, comprises a data content portion that comprises the collected MDT data, and comprises a hash value that is calculated based on a hash value of a preceding block of the MDT block chain, based on the data content portion, and based on the nonce value; and
sending the block to a MDT block chain management server for adding to the MDT block chain.

2. The method of claim 1, wherein the mobile communication devices are mobile phones, smart phones, personal digital assistants (PDAs), wearable computers, headset computers, laptop computers, notebook computers, or tablet computers.

3. The method of claim 1, further comprising:
storing MDT data produced by the mobile communication devices in a MDT results data store;
retrieving MDT data from the MDT results data store;
analyzing the MDT data retrieved from the MDT results data store;
adapting operation parameters of a cell site based on analyzing the MDT data.

4. The method of claim 3, where the MDT data is produced by mobile communication devices associated with a first wireless communication service provider and the MDT data is retrieved by, analyzed by a second wireless communication service provider to adapt operation parameters of a cell site of the second wireless communication service provider.

5. The method of claim 1, wherein causing at least some of the mobile communication devices in the second population of MDT candidate mobile communication devices to perform the MDT comprises building a MDT manifest that identifies the mobile communication devices in the second population of MDT candidate mobile communication devices and transmitting the MDT manifest to a server computer that executes an MDT server application that commands the mobile communication devices identified in the MDT manifest to perform the MDT.

6. The method of claim 5, wherein the MDT manifest identifies tests to be performed by MDT candidate mobile communication devices.

7. The method of claim 5, wherein the MDT manifest identifies performance data to be collected by MDT candidate mobile communication devices.

8. A minimization drive test (MDT) selection server computer, comprising:
a processor;
a non-transitory memory; and
a MDT selection application stored in the non-transitory memory that, when executed by the processor
receives a mobile communication device selection criteria, where the criteria identifies a device candidate profile, identifies a matching threshold, and identifies a number of mobile communication devices that are to perform a MDT,
determines a degree of match of a plurality of MDT candidate mobile communication devices to the device candidate profile,
identifies a first population of MDT candidate mobile communication devices that achieve a degree of match to the device candidate profile above the matching threshold of the criteria,
analyzes a MDT participation history of each of the first population of MDT candidate mobile communication devices,
identifies a second population of MDT candidate mobile communication devices among the first population of MDT candidate mobile communication devices based on the analysis of the MDT participation histories of the devices in the first population of MDT candidate mobile communication devices, where the number of devices in the second population of MDT candidate mobile communication devices is at least as large as the number of mobile communication devices identified in the mobile communication device selection criteria, causes the mobile communication devices in the second population of MDT candidate mobile communication devices to perform a MDT, collects MDT data from the at least some of the MDT candidate mobile communication devices in the second population of MDT candidate mobile communication devices, generates a block of a MDT block chain where the block comprises a nonce value, comprises a data content portion that comprises the collected MDT data, and comprises a hash value that is calculated based on a hash value of a preceding block of the MDT block chain, based on the data content portion, and based on the nonce value, and sends the block to a MDT block chain management server for adding to the MDT block chain.

9. The MDT selection server of claim 8, wherein the device candidate profile defines at least two of a mobile communication device location, a mobile communication device model, a mobile communication device software version, and a subscriber mobility pattern.

10. The MDT selection server of claim 8, further comprising accessing MDT participation history about the first population of MDT candidate mobile communication devices from a MDT participation history data store by the MDT selection application.

11. The MDT selection server of claim 10, further comprising accessing information about the plurality of MDT candidate mobile communication devices from a device profile data store by the MDT selection application, wherein determining a degree of match of a MDT candidate mobile communication device to the device candidate profile comprises determining a match of the information about the MDT candidate mobile communication device accessed from the device profile data store.

12. The MDT selection server of claim 8, wherein causing the mobile communication devices in the second population of MDT candidate mobile communication devices to perform the MDT comprises causing the MDT candidate mobile communication devices to collect and report MDT data about at least one of dropped call rates, blocked call rates, signal strength, or signal to noise ratio.

13. The MDT selection server of claim 8, wherein the second population of MDT candidate mobile communication devices are all associated with a single wireless communication service provider network.

14. The MDT selection server of claim 8, wherein the second population of MDT candidate mobile communication devices are all associated with at least two different wireless communication service provider networks.

15. A method of performing a minimization drive test (MDT) using mobile communication devices, comprising:

receiving a mobile communication device selection criteria by a MDT selection application executing on a computer system;

selecting a plurality of MDT candidate mobile communication devices by the MDT selection application based on the selection criteria;

causing the MDT candidate mobile communication devices to perform a MDT;

collecting MDT data from the MDT candidate mobile communication devices;

generating a block of a MDT block chain where the block comprises a nonce value, comprises a data content portion that comprises the MDT data collected from the MDT candidate mobile communication devices, and comprises a hash value that is calculated based on a hash value of a preceding block of the MDT block chain, based on the data content portion, and based on the nonce value; and sending the block to a MDT block chain management server for adding to the MDT block chain, whereby MDT data generated by multiple different wireless communication service providers is shared in a transparent and secure manner.

16. The method of performing a minimization drive test (MDT) using mobile communication devices of claim 15, further comprising:

retrieving MDT data from the MDT block chain;

analyzing the MDT data retrieved from the MDT block chain;

adapting operation parameters of a cell site based on analyzing the MDT data.

17. The method of performing a minimization drive test (MDT) using mobile communication devices of claim 16, where the MDT mobile communication devices from which MDT data is collected are configured to receive wireless communication service primarily with a first wireless communication service provider and the MDT data is retrieved by and analyzed by a second wireless communication service provider to adapt operation parameters of a cell site of the second wireless communication service provider.

18. The method of performing a minimization drive test (MDT) using mobile communication devices of claim 16, where the MDT mobile communication devices from which MDT data is collected are configured to receive wireless communication service primarily with a first wireless communication service provider and the MDT data is retrieved by and analyzed by the first wireless communication service provider to adapt operation parameters of a cell site of the first wireless communication service provider.

19. The method of performing a minimization drive test (MDT) using mobile communication devices of claim 15, wherein the mobile communication devices are mobile phones, smart phones, personal digital assistants (PDAs), wearable computers, headset computers, laptop computers, notebook computers, or tablet computers.

20. The method of performing a minimization drive test (MDT) using mobile communication devices of claim 15, wherein the collected MDT data comprises information about at least one of dropped call rates, blocked call rates, signal strength, or signal to noise ratio.

* * * * *